United States Patent
Parker, Jr. et al.

(10) Patent No.: US 10,024,431 B2
(45) Date of Patent: Jul. 17, 2018

(54) CONTROL DEVICE AND CONTROL METHOD FOR VEHICLE

(71) Applicant: HONDA MOTOR CO., LTD., Minato-Ku, Tokyo (JP)

(72) Inventors: Dennis Parker, Jr., Torrance, CA (US); Hiroyuki Kuki, Torrance, CA (US); Taichi Kitamura, Wako (JP); Takeru Tajima, Wako (JP); Yoshiyuki Kokubo, Wako (JP); Shunpei Hino, Wako (JP); Hiroki Kimura, Wako (JP); Shinichiro Watanabe, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 255 days.

(21) Appl. No.: 14/909,286

(22) PCT Filed: Jul. 23, 2014

(86) PCT No.: PCT/JP2014/069422
§ 371 (c)(1),
(2) Date: Feb. 1, 2016

(87) PCT Pub. No.: WO2015/016109
PCT Pub. Date: Feb. 5, 2015

(65) Prior Publication Data
US 2016/0186859 A1 Jun. 30, 2016

Related U.S. Application Data

(60) Provisional application No. 61/861,661, filed on Aug. 2, 2013.

(51) Int. Cl.
*F16H 63/48* (2006.01)
*F16H 59/74* (2006.01)
(Continued)

(52) U.S. Cl.
CPC ............ *F16H 63/483* (2013.01); *B60T 7/107* (2013.01); *B60T 7/12* (2013.01); *B60T 13/662* (2013.01);
(Continued)

(58) Field of Classification Search
CPC ............ F16H 63/483; F16H 2059/746; F16H 2312/12
See application file for complete search history.

(56) References Cited

U.S. PATENT DOCUMENTS

| 2002/0020236 A1 | 2/2002 | Onodera | |
| 2013/0158838 A1* | 6/2013 | Yorke | B60W 10/06 701/103 |
| 2014/0039746 A1* | 2/2014 | Geissenhoner | B60K 26/00 701/22 |

FOREIGN PATENT DOCUMENTS

| JP | S60-195228 U | 12/1985 |
| JP | H03-006164 U | 1/1991 |

(Continued)

OTHER PUBLICATIONS

Machine translation of JP2010190311 filed Dec. 4, 2017 (Year: 2017).*

(Continued)

*Primary Examiner* — Tisha D Lewis
(74) *Attorney, Agent, or Firm* — Carrier Blackman & Associates, P.C.; Joseph P. Carrier; Jeffrey T. Gedeon

(57) ABSTRACT

This control device for a vehicle switches a shift range of an automatic transmission through the use of an actuator, wherein the control device for a vehicle is characterized in being provided with a shift selection unit for receiving a shift position selection from a driver and a control unit for switching the shift range to a parking range through the use of an actuator when a vehicle power source turns off or when a drive power source stops, the control unit maintaining a (Continued)

neutral range, when the vehicle power source turns off or when the drive power source stops, until the elapse of a first prescribed time after the shift selection unit receives a neutral position selection while the vehicle power source is on or while the drive power source is driving.

12 Claims, 7 Drawing Sheets

(51) Int. Cl.
  *B60T 17/22*   (2006.01)
  *B60T 7/10*   (2006.01)
  *B60T 7/12*   (2006.01)
  *B60T 13/66*   (2006.01)
  *B60T 13/74*   (2006.01)
  *F16H 63/42*   (2006.01)

(52) U.S. Cl.
  CPC .............. *B60T 13/74* (2013.01); *B60T 17/22* (2013.01); *F16H 63/42* (2013.01); *B60T 2260/04* (2013.01); *F16H 2059/746* (2013.01)

(56) References Cited

FOREIGN PATENT DOCUMENTS

| | | |
|---|---|---|
| JP | 2003054366 A | 2/2003 |
| JP | 2003080967 A | 3/2003 |
| JP | 2007070546 A | 3/2007 |
| JP | 2008-037289 A | 2/2008 |
| JP | 2010-190311 A | 9/2010 |
| JP | 2010-242898 A | 10/2010 |
| JP | 2011-074981 A | 4/2011 |

OTHER PUBLICATIONS

Machine translation of JP2011074981 filed Nov. 30, 2017 (Year: 2017).*

Office Action corresponding to Chinese Patent Application 201480042628.6 dated Sep. 26, 2016.

* cited by examiner

FIG. 6

| Driver's operation | Shift to N from D | | None | None | Shift R/N/D from P |
|---|---|---|---|---|---|
| Multi-information display | 5309mi 32°F | Shift to Park. P | Shift to Park. P | END | TO SHIFT FROM P ENGINE MUST BE RUNNING |
| Voice | — | "Bong" | — | — | — |
| Shifter | P R N D | P R N D | P R N D | P R N D | P R N D |
| Ignition | IG-ON | IG-ON→ACC | ACC | ACC→IG-OFF | IG-ON |
| Engine | Running | Stop | Stop | Stop | Stop |
| TCU timer | — | 15 min. or 10 min. | 15 min. > timer value > 0 min. | 0 min | — |
| Battery voltage | 12 volts | 12 volts | 12 volts | < 8 volts | 12 volts |
| Same as general shifter? | Yes | Yes | Yes | Yes | No |

FIG. 7

| Driver's operation | Shift to N from D | None | | None | None | Shift to R/N/D from P ~322 |
|---|---|---|---|---|---|---|
| Multi-information display | 5309mi 32°F | Shift to Park. [P] | Shift to Park. [P] | | | TO SHIFT FROM [P] ENGINE MUST BE RUNNING |
| Shifter | [P R N D] | [P R N D] | [P R N D] | [P R N D] / [P R N D] | [P R N D] | [P R N D] —322a |
| TCU mode | IG-ON | Vehicle washer mode (IG-OFF) When parking switch is pressed, vehicle washer timer value = 0, or Battery voltage is lower than xx volts | | General (automatic P) (IG-OFF) | Shut down TCU (sleep) Ending | IG-ON (Engine) |
| CAN signal for display (TCU output) | Same as Normal | SBW_STAY_AWAKE_REQ=1 SBW_STAY_AWAKE_REQ_MID=1 EAT_STAY_AWAKE_REQ=1 SBW_MID_SHIFT_TO_P=1 & Send position signals | | SBW_STAY_AWAKE_REQ=0 SBW_STAY_AWAKE_REQ_MID=0 EAT_STAY_AWAKE_REQ=0 SBW_MID_SHIFT_TO_P=0 & Send position signals | No signal from TCU (MID is controlled by meter) | 322b SBW_MID_SHIFT_FROM_P=1 |

CONTROL DEVICE AND CONTROL METHOD FOR VEHICLE

TECHNICAL FIELD

The present invention relates to a control device and a control method for a vehicle including a shift-by-wire type of transmission system.

BACKGROUND ART

Recently, vehicles using a shift-by-wire type of transmission system become popular in which a shift device is electrically connected with a transmission which is operated through transmitting an electric signal indicating a shift operation by a driver. In such a vehicle, when the ignition switch is turned off, the transmission is automatically switched to a parking range irrespective of driver's operation to the shift device (shifter). Accordingly, the vehicle never moves, though upon getting out of a car the driver forgets to switch the transmission to the parking range by operation of the shift device by the driver. Accordingly, the shift-by-wire type of the transmission system is useful and a safe device.

However, there are many cases in which this mode change operation (the transmission is automatically switched to the parking range) causes troubles. For example, it is assumed that the vehicle is mounted on a conveyor for single-sided automobile transfer, i.e., wheels on one side out of right and left wheels of the vehicle, are mounted on the conveyor to pass a vehicle washer. The driver should turn off the engine and then change the transmission to a neutral range to cause the left and right wheels rotate freely to easily pass the vehicle washer. However, if the transmission is automatically switched to the parking range when the engine is turned off, the vehicle cannot pass the vehicle washer.

To avoid this, there are many methods and approaches to allow the driver to shift the transmission to the neutral range. Such prior art includes the case where the driver causes the vehicle to enter the vehicle washer mode by keeping a holding state of the neutral button after turning off of the engine.

For example, Patent Document 1 relates to a production line for vehicles which exceptionally releases the automatically switching to the parking range. More specifically, in the control device of the shift by wire type of vehicle disclosed in Patent Document 1, when an operation pattern by the driver to an operation input device (shift device) during turning ON of a power switch agrees with a predetermined pattern, switching to the parking range is inhibited though the power switch is turned off. As a result, the neutral range is kept. This prevents the wheels not on the conveyor for single-sided automobile transfer from being dragged without rotation with saving an electric power.

PRIOR ART

Patent Document

Patent Document 1: JP2010-190311 A

SUMMARY OF INVENTION

Problem to be Solved by Invention

However, "predetermined pattern" in Patent Document 1 is unnatural for the driver because a button switch is pressed more than a predetermined number of times within a period longer than a predetermined threshold while the neutral position is kept. Accordingly, a general driver frequently cannot intuitively understand and remember such a pattern except a driver (operator) working in a production line. Further, an erroneous operation, such as erroneous touching the button switch with a luggage of the driver, may easily occur.

Accordingly, the present invention aims to bring the vehicle to the vehicle washer mode without any complicated operation load.

Means for Solving Problem

An aspect of the invention provides a control device for the vehicle to switch a shift range of an automatic transmission with an actuator. The control device of the vehicle includes a shift selecting unit receiving a selection of a shift position by the driver and a control unit switching the shift range to the parking range with the actuator when the power source of the vehicle turns off or when a driving power source is stopped. Further, in a state that the vehicle electric power source is on or the driving power source is operating, the control unit keeps a neutral range when the vehicle electric power source is turned off or when the driving power source is stopped, until a predetermined period has passed after the shift selecting unit receives a selection of the neutral position.

According to the control device of the vehicle, the operation by the driver is limited to the selection of the neutral position and turning off of the vehicle electric power source or the stop of the engine just after the selection of the neutral position. Accordingly, it becomes possible for the driver to maintain the neutral range by an intuitively and simple operation. Further, "Stop of driving power source" includes a case where the driving power source mechanically stop even though an electric power is supplied to a device other than the driving power source in a state, such as an idling stop state.

An aspect of the present invention provides the control unit that switches the shift range to the parking range with the actuator when the vehicle power source is turned off or when the driving power source stops when a first predetermined time period has passed after reception of the selection of the neutral position.

According to the control unit, when the driver does not make an operation intentionally immediately after the selection of the neutral position by the driver, the shift range is switched to the parking range according to the rule. As a result, this can prevent the neutral range from being maintained by an erroneous operation, which contributes increase in safeness.

An aspect of the present invention provides the control device that includes at least one of a power switch for operating the vehicle electric power source between ON and OFF and a starter switch for operating the driving power source between start and stop. The control unit maintains the neutral range when the power switch is turned off or when the starter switch turned off or in an accessory selection state, until a first predetermined period has passed after reception of the selection of the neutral position.

According to the control device, the driver can maintain the neutral range by operating a general switch, i.e., the power switch or the starter switch. Accordingly, this eliminates necessity to additionally install a special switch, which reduces the number of components.

An aspect of the present invention provides a control unit. When the neutral range is maintained in a state in which the vehicle electric power source is in an OFF state, or in a state in which the drive power source is stopping, only for a second predetermined period, the control unit brings a part of the vehicle power source to a started up state and alarms that the vehicle is in a state in which the neutral range is maintained.

According to the control unit, the driver can easily recognize that the neutral range is kept exceptionally irrespective of turning off of the vehicle electric power source or the stop of the driving power source. Accordingly, safeness is enhanced.

An aspect of the present invention provides the control unit that maintains the neutral range in a state in which the vehicle electric power source is in an OFF state, or in a state in which the drive power source is stopping, the control unit brings an electric power source necessary for operating the shift selecting unit to a started up state, and switches the shift range to the parking range when the shift selecting unit receives the selection of the parking position.

According to the control unit, it is possible to make switching to the parking range without operation of starting up the electric power source again. Accordingly, an operationability to secure is enhanced.

An aspect of the present invention provides the control device of the vehicle that includes a vehicle speed detecting unit detecting a speed of the vehicle, wherein when the control unit is maintaining the neutral range in a state in which the vehicle electric power source is in an OFF state, or when the neutral range is maintained in a state in which the drive power source is stopping, the control unit switches the shift range to the parking range when the vehicle speed equal to or higher than a predetermined value.

According to the control device, the vehicle can be stopped though the vehicle starts to move because of inclination of a road surface. Accordingly, safeness is enhanced.

An aspect of the present invention provides the control unit that switches the shift range to the parking range when a second predetermined period has passed after the control unit maintains the neutral range in a state in which the vehicle electric power source is in an OFF state, or in a state in which the drive power source is stopping.

According to the control unit, it is possible to return the shift range to the parking range though the driver forgets that the parking range is automatically released. Accordingly, the safeness is enhanced.

An aspect of the invention provides the control device that further comprises a starter switch controlling the vehicle electric power source to turn on/off and the drive power source to start up and stop. The control unit maintains the neutral range when the starter switch is turned off or to an accessory selection state at time until the first predetermined period has passed after the shift electing unit receives a selection of the neutral position and alarms the operator that the vehicle electric power source is started up when a second predetermined period has passed while the neutral range is maintained or when the shift selection unit receives the selection of the parking position.

According to the control device, the driver operates, in place of a push type of switch, the starter switch of a rotating type, which must be operated more intentionally than the push type of switch. Accordingly, to maintain the neutral range, more intentional operation by the driver is needed. As a result, erroneous operation may be reduced. Further, according to the control device, it can be prevented that the driver forgets to turn off the system of the vehicle. As a result an electric power can be saved.

An aspect of the present invention provides methods using the control device or the control unit as described above.

Advantageous Effect of Invention

According to the present invention, the vehicle can be shifted to the vehicle washer mode without any complicated operation load on the driver.

BRIEF DESCRIPTION OF DRAWINGS

FIG. 6 is a drawing illustrating corresponding relation between driver's operation and a display, etc in the vehicle cabin.

FIG. 7 is a drawing illustrating corresponding relation between the driver's operation and display signal, etc.

MODES FOR CARRYING OUT INVENTION

Figure 1:
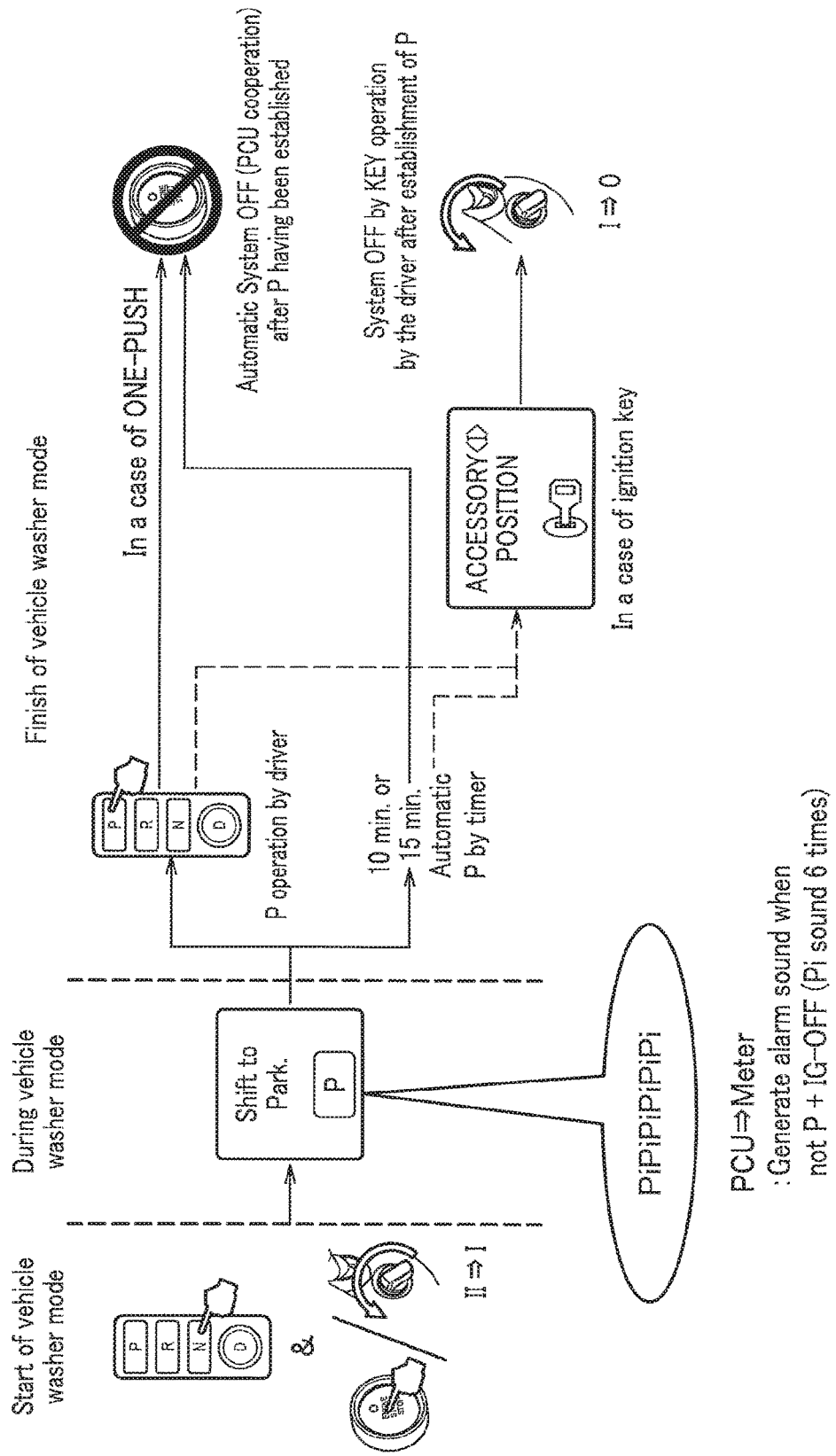
FIG. 1 is a drawing illustrating a flow from start to finish of a vehicle washer mode.

The present invention relates to a control device and a control method regarding a vehicle mode. More specifically, a control device and a control method set a vehicle in a vehicle washer mode, and release the vehicle from the vehicle washer mode.

The present invention relates to setting the vehicle in the vehicle washer mode and releasing the vehicle from the vehicle washer mode and includes a control device and a control method for awaking the driver from intentionally or carelessly leaving from the vehicle whose transmission is left in a neutral range. When the driver/user carelessly left from the vehicle whose transmission is left in the neutral range, an automatic parking range setting function is activated to prevent the vehicle from starting to move.

In the present embodiment, the automatic parking range setting function is a function which a TCU (Transmission Control Unit) 1b described later with reference to FIG. 3 has. Like this, the function of the vehicle washer mode is a function which the TCU 1b shown in FIG. 3 has.

The present invention relates to setting and releasing of the vehicle washer mode and provides the control device and control method for switching the vehicle to the vehicle washer mode by the driver. In the vehicle washer mode of the present invention, it is assumed that the transmission is in the neutral range irrespective of ON or OFF of the engine.

According to an embodiment of the present invention, the driver changes the transmission to the neutral range while the engine of the vehicle is rotating. The operation to change the transmission to the neutral range activates a timer. When the engine is turned off within a period starting from activation of the timer, the transmission maintains the neutral range. However, when the timer expires before the engine is turned off (when a predetermined period expires from the selection of the neutral range) before the engine of the vehicle is turned off, the transmission is automatically switched to the parking range from the neutral range. This operation minimizes a possibility in that the driver forgets that the transmission is in the neutral range or that the transmission is switched to the neutral range erroneously.

According to an embodiment of the present invention, there is provided a control device and a control method for switching to the vehicle washer mode when a timewise condition is satisfied before the engine is turned off.

A timer may be activated in response to a trigger that the driver stops the vehicle and presses the neutral switch (or a trigger that the shift lever is shifted to the neutral position). When the power switch is pressed before the timer expires (a predetermined period has passed after its activation), the vehicle washer mode is set.

According to an embodiment of the present invention, a period from when there is a request to the neutral range to when the ignition is turned off is measured by a timer, so that it becomes easy to demonstrate or confirm that the driver switches the transmission to the neutral without forgetting before the driver turns off the ignition. As described above, according to the present embodiment, the automatic parking range setting function and the vehicle washer mode are safely used by clearly identifying intention of the driver (leaving from the vehicle).

As long as there is no departure from the spirit of the present invention, the control device and the control method of the present invention are not limited to hybrid cars, electric cares, fuel cell vehicles or a conventional type of internal combustion vehicles, and applicable to all types of vehicles having the shift-by-wire system.

The control device and the control method of the present invention automatically make the vehicle in a stable condition with the transmission. In the sable state, though an external force is applied to the vehicle, or the vehicle is parked on a slope, the vehicle cannot move.

The present invention provides the control device and the control method for preventing unintentional movement of the vehicle though the driver left from the vehicle whose shifter is shifted to a given position other than the parking. In other words, when the current shift range is in a given position other than the parking, when the driver turns off the ignition, the transmission switches to the parking range from the shift range other than the parking range.

The shifter is any device as long as the device can change the transmission speed range in response to an electric signal. The shifter may have any shape including a lever, button switches, etc. Further, the term of "shift selecting unit" corresponds to the shifter.

Further, the automatic transmission (also simply referred to as "transmission") used in the present invention is not limited to a specific type in structure, but any automatic transmission including ranges of driving (D), a reverse (R), a neutral (N), and a parking (P).

The present invention provides the control device and the control method which can set the vehicle in the vehicle washer mode by an intuitively operation for the driver only when the driver clearly intends to wash the vehicle.

A flow is described from start to finish of the vehicle washer mode referring to FIG. 1.

(Start of Vehicle Washer Mode)

First, as shown by "Start of vehicle washer mode" in FIG. 1, the user electronically sets the transmission in the neutral range through the shifter, i.e., the shift-by-wire system. As this instance, irrespective of the engine being running, it is assumed that the ignition key is in a position of ON. Alternatively, in an electric vehicle (hybrid vehicle) including a Start/Stop switch, it is assumed that the Start/Stop switch is in a position of "Start". As described above, in this example, it is assumed that the function of the shift-by-wire, the automatic parking range setting function, the vehicle washer mode, etc. are realized by the TCU (transmission control unit) 1b shown in FIG. 3.

Regarding this, a key cylinder into which the ignition key is inserted has engraving marks of "0", "I", "II", and "III" indicating a position of the ignition key in this order. An indication, "II to I", at a left part of FIG. 1, means that the ignition key is changed from a position II of the ignition key (engine starting state) to a position I (ACC (Accessory)). Further, "III" is a position for starting the engine (engine start with a starting motor).

Next, as shown in "Start of vehicle washer mode" in FIG. 1, the ignition key (mechanical key) inserted into the key cylinder is rotated from the position II to the accessory position (position I) or further rotated to (position 0) until a predetermined period (first predetermined period) has passed after setting the transmission to the neutral range, so that the user can set the vehicle to the vehicle washer mode. Alternatively, the user can set the vehicle to the vehicle washer mode by turning the Start/Stop switch to "Stop" by pressing the Start/Stop switch until the predetermined period (first predetermined period) has passed. It is preferable that the predetermined period (first predetermined period) is from 2 to 90 seconds.

In other words, the present embodiment utilizes such an operation that a mechanical key (ignition key) is inserted and rotated or the button switch (Start/Stop switch) is pressed, so that the ignition is turned on and off. Further, a period ranging from 2 to 90 seconds is reasonable as a period of performing such a continuous operation that "neutral range setting" and, "rotating the ignition key (or pressing the Start/Stop switch is pressed)" are intentionally performed. In addition, the continuous operation period of from 2 to 90 seconds is reasonable to understand an intention of the driver to keep the neutral range after stop of the engine (turning off the vehicle power source).

(During Vehicle Washer Mode)

The vehicle (more specifically, TCU 1b) informs the user or the driver that the vehicle is shifted to the vehicle washer mode. During this, the vehicle generates an indication, which is visual, and or a sound audible. As such example of indication•sound, an light emitting diode, a display panel, a graphic user interface (GUI), or a figure on a display/screen, a voice, an alarm whistle, a bell, a chime, and a cue are usable. These are only examples, and there are other examples not limited to this.

Further, "Shift to park. P" in the vehicle washer mode in FIG. 1 is an example of indication for alarming the driver that please shifts the range to the parking position when the driver has "an intention for parting".

From the start of vehicle washing to the end of vehicle washing, the transmission maintains the neutral range.

When the ignition key is in the position "I", though the engine stops (the Start/Stop switch is in "Stop"), accessory devices (Accessories) are supplied with a power to keep its function. The accessory devices includes the PCU (power source control unit), the TCU transmission control unit), audio devices, a navigation device, etc., but are not limited to these. As described, a part of the devices are supplied with the power because in the vehicle washer mode, the PCU, the TCU, and the shift unit are used. These units are also supplied with the electric power also in the accessory mode as described above.

Once the vehicle enters the vehicle washer mode, the vehicle washer mode is maintained until the driver or the operator selects the parking position with the shifter or a predetermined period (second predetermined period) has passed. It is preferable that the predetermined period (second predetermined period) is ten to fifteen minutes. The second predetermined period is determined in consideration of a period until the vehicle washing has finished.

The driver selects the vehicle washer mode to allow the vehicle to pass through the vehicle washer. The vehicle washer assumed here is a typically, the conveyor for single-sided automobile transfer. However, the vehicle washer may be other systems including a non-contact vehicle washing system, and a tunnel conveyer belt type vehicle washer which fixes one-wheel, two-wheel, or four-wheel vehicles.

(Finish of Vehicle Washer Mode)

After completion of the vehicle washing, the vehicle washer mode is completed. More specifically, the vehicle washer mode is completed in response to occurrences listed below as a trigger.

(1) When the driver rotates the mechanical key (ignition key) from the accessory position (I) to the OFF (0) position, the vehicle washer mode completes. When the vehicle is in the vehicle washer mode, the driver cannot shift the transmission from the neutral range to a drive range or the reverse range.

(2) When the driver presses the Start/Stop switch, or when the driver shifts the transmission to the parking range, the vehicle washer mode completes.

(3) When the predetermined period (second predetermined period) has passed, the vehicle washer mode completes. In other words, when the predetermined period has passed, the transmission is automatically shifted to the parking range to keep the vehicle an immovable state thereafter. In this case, the second period is preferably from 5 to 30 minutes, and more preferably from 10 to 15 minutes.

Figure 2:
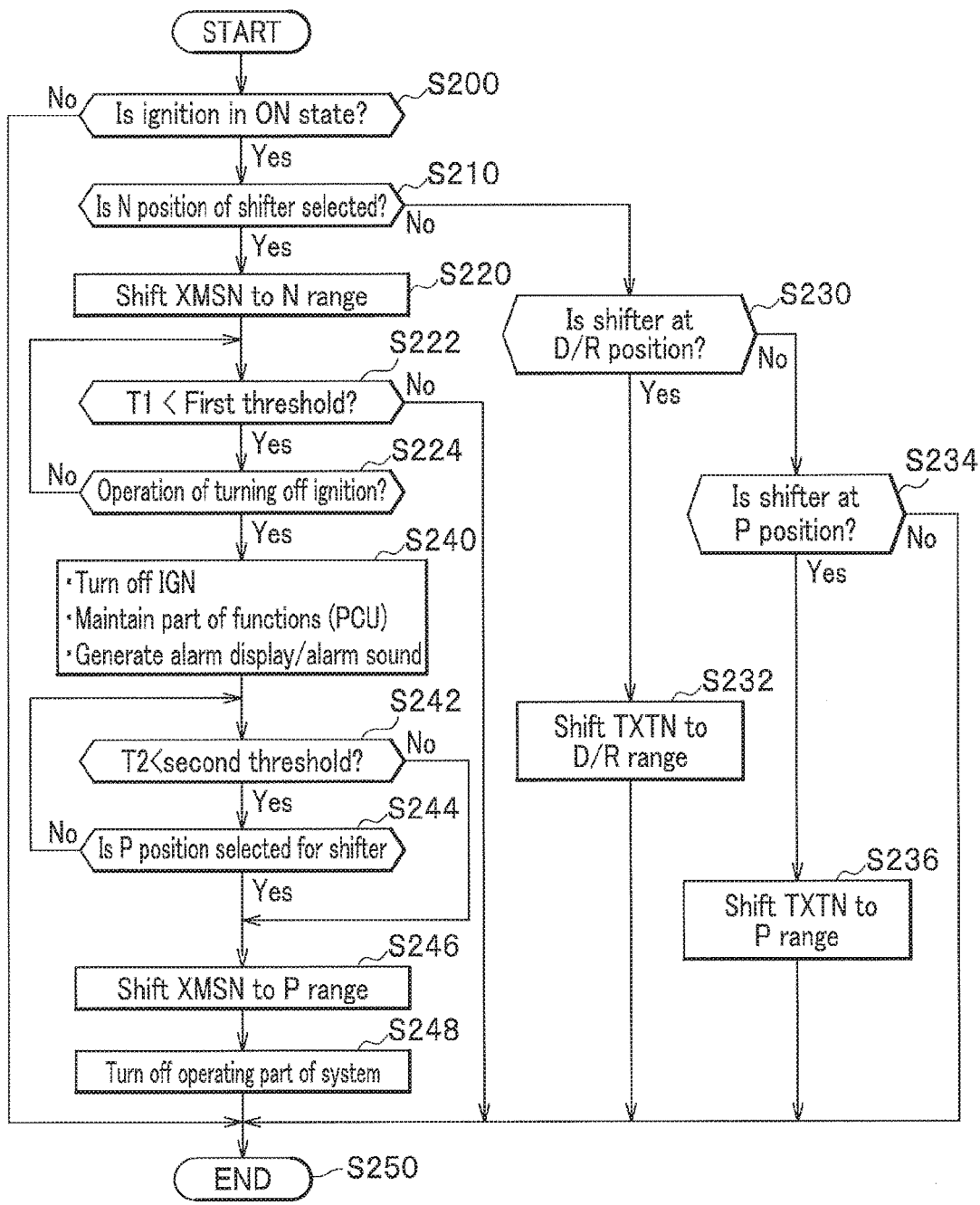
FIG. 2 is a flowchart illustrating a processing procedure of the control device.

FIG. 2 is a flowchart of a process/method according to an embodiment of the present invention.

In a step S200, a control unit of the control device in the vehicle determines whether the ignition of the vehicle is in an ON state (IG-ON) or not. When the ignition is in OFF state ("No" in a step 200), the control unit proceeds to a step S250, and completes the processing. When the ignition is in the ON state ("Yes" in the step S200), the control unit proceeds to a step S210.

Here, "the state in which the ignition is in the ON state" is a concept including the state in which the vehicle electric power source is in an ON state, or the engine (driving power source) is operating. For example, the state in which the Start/Stop switch is turned to "Start" or the ignition key is at a position of "II" are given.

In the step S210, the control unit determines whether the shifter of the vehicle is at the neutral position. In other words, it is determined what position the shifter is at (shift position) as a result of the operation of the driver. When the shifter is not at the neutral position ("No" in the step S210), the control unit proceeds to a step S230. When the shifter is at the neutral position ("Yes" in the step S210), the control unit proceeds to a step S220.

In the step S230, the control unit determines whether the shifter of the vehicle is at the driving position or the reverse position. When the shifter is at the driving position or the reverse position (Yes in the step S230), the control unit proceeds to the step S232. When the shifter is neither at the driving position or the reverse position ("No in the step S230), the control unit proceeds to a step S234.

In a step S232, the control unit shifts the transmission ("TMSN") to the driving range or the reverse range. Next, the control unit proceeds to the step S250 to finish process.

In the step S234, the control unit determines whether the shifter of the vehicle is at the parking position. When the shifter is at the parking position ("Yes" in the step S234), the control unit proceeds to a step S236. When the shifter is not at the parking, ("No" in the step S234), the control unit proceeds to the step S250 to finish the process.

Further, there is a case where the position of the shifter is in a deceleration position (B or L). In the present embodiment, the position of driving (D) is a concept including a decelerating position. Further, processing proceeds through a pass of "No" in the step S234 means that a position of the shifter is neither of D (B, L), R, nor N. A side of the system may recognize like this irrespective of an intention of the driver.

In the step S236, the control unit shifts the transmission to the parking range. The control unit proceeds to the step S250 to finish the process.

In the step S220, the control unit shifts the transmission to the neutral range. At this instance, the control unit starts up a timer.

In a step S222, the control means determines whether a timer value $T_1$ smaller than the first threshold (the first predetermined period). As described above, the timer is started up when the shifter is shifted to the neutral position. In other words, the timer value $T_1$ indicates the time length passing from when the shifter is shifted into the neutral position to the current time.

When the timer value $T_1$ is not smaller than the first threshold ("No" in the step S222), processing proceeds to the step S250 to finish the process. When the timer value $T_1$ is smaller than the first threshold, ("Yes" in the step S222), the control unit proceeds to a step S224.

In the step S224, the control unit determines whether there is an operation to turn off the ignition. When there is no operation to turn the ignition OFF (IG-OFF) ("No" in the step 224), the control unit returns to the step S222. When there is an operation to turn off the ignition ("Yes" in the step S224), the control unit proceeds to a step S240. Further, "turning the ignition off" is a concept including turning off the vehicle power source (the driver makes "Stop" of the vehicle by pressing the "Start/Stop SW") or stopping the engine (drive power source) (the driver turns the ignition key from "II" to "I" or "0").

In the step S240, the control unit executes the following process.

(1) The control unit turns off the ignition.
(2) However, the PCU supplies such a power that a part of functions can be alive.
(3) The control unit informs the user that the vehicle has shifted to the vehicle washer mode.

In a step S242, the control unit determines whether a timer value $T_2$ is smaller than the second threshold (second predetermined period). Further, as described above, the timer value $T_2$ indicates a time length passing from when the shifter entered the neutral range to the current time.

When the timer value $T_2$ is not smaller than the second threshold ("No" in the step S242), the control unit proceeds to a step S246. When the timer value $T_2$ is smaller than the second threshold ("Yes" in the step S242), the control unit proceeds to a step S244.

In the step S244, the control unit determines whether the shifter is at the parking position. When the shifter is not at the parking position ("No" in the step S244), the control unit returns to the step S242. When the shifter is at the parking position ("Yes" in the step S244), the control unit proceeds to the step S246.

In the step S246, the control unit shifts the transmission to the parking range.

In a step S248, the control unit turns off the part of the system which have been activated.

In the step S250, the control unit finishes the process.

Figure 3:
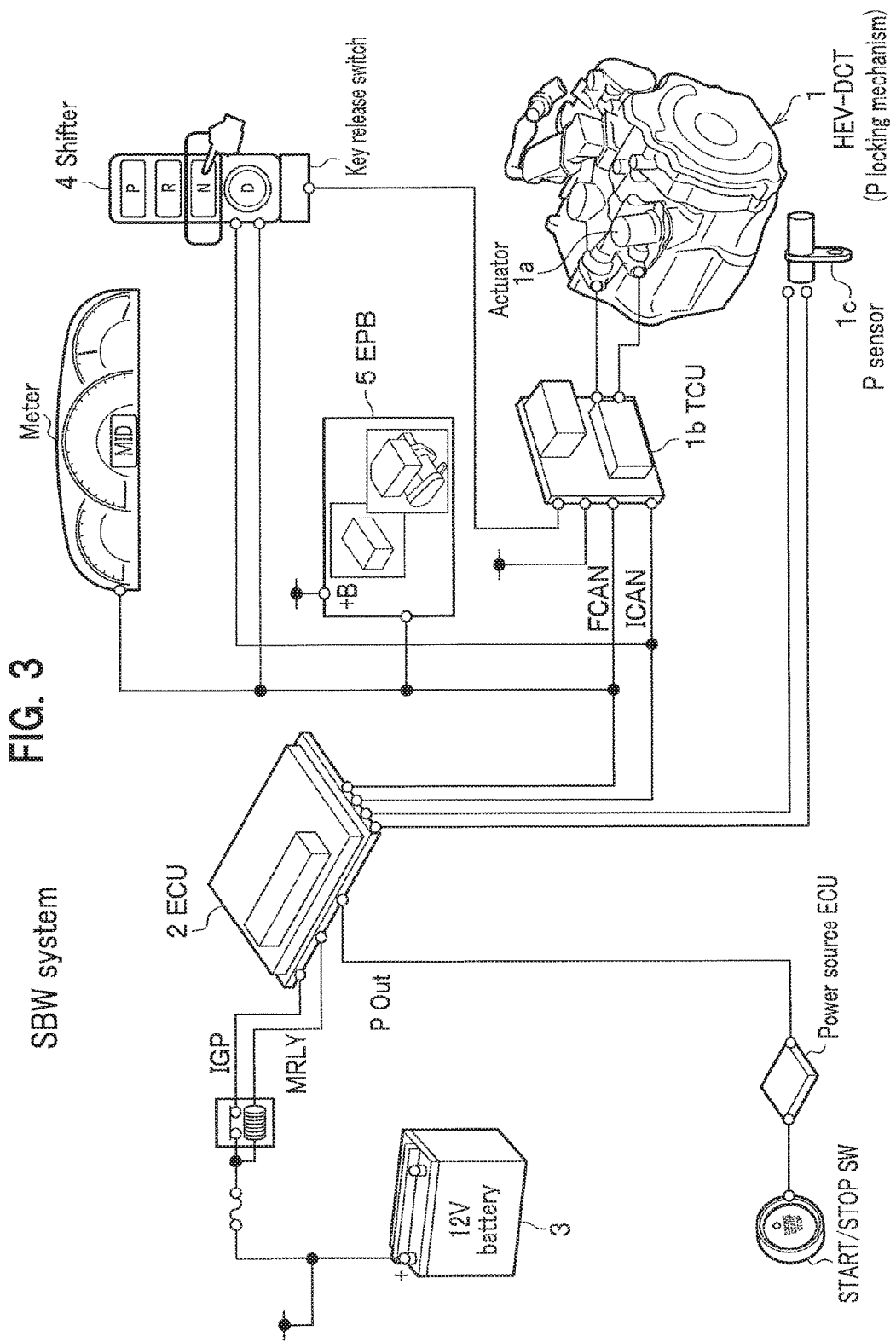
FIG. 3 is a drawing illustrating the shift-by-wire system.

FIG. 3 is a drawing illustrating the shift by wire system according to the embodiment of the present invention.

An automatic transmission (HEV-DCT: Hybrid Electric Vehicle-Dual Clutch Transmission) 1 is an automatic transmission with dual clutches for a hybrid vehicle). The HEV-DCT 1 includes a parking lock function.

An actuator 1a is a gear actuator selecting a gear and other transmission parts.

The TCU 1b is a transmission control unit.

A P sensor 1c is a parking sensor for detecting an actual state of the parking lock.

An ECU (Electronic Control Unit) 2 is an electronic control unit for controlling a fuel injection device, the transmission, and a battery.

A 12V-battery 3 is a low voltage battery for the in-vehicle system.

A shifter 4 is a shift device of a shift position selecting type.

An EPB (Electric Parking Brake) 5 is an electric drive system for operating the parking brake.

As shown in FIG. 3, the hybrid vehicle includes an automatic transmission (HEV-DCT) 1 and the shifter 4 whose position is selected by the driver. The shifter 4 includes a shift button (("P", "R", "N", and "D") which are operated by the driver and a shift sensor for detecting a shift position selected by the driver's shift button operation and converting the detected shift position into an electric signal, and transmitting the shift position signal to the TCU 1b, which is the control unit. In other words, the shift position signal transmitted by the shift sensor to the TCU 1b is the electric signal indicating one of the shirt positions selected by the shifter 4.

In place of the shift button, the shifter 4 may include a shift lever (not shown). The shift lever moves along predetermined patterns, and a plurality of shift positions are arranged along the shift patterns. There are shift positions arranged on the shifter 4, i.e., "P", "R", "N", and "D". Further, a H position (home position) may be installed, and the shift lever may be configured to be automatically returned to the H position.

In the case of the shifter 4 including the shirt lever, when the driver shifts the shift lever to a position the driver desires to select the shift position, the shift sensor detects the shift lever at a corresponding shift position and transmits the shift position signal indicting the detected shift position of the shift lever to the TCU 1b. The TCU 1b is configured to acquire the shift position selected by the driver from the shift position signal transmitted from the shirt sensor.

Further, "key release SW (switch)" adjoined to the shifter 4 is a device for allowing the shift operation without turning on the ignition switch when the vehicle power source is turned off at the parking range. More specifically, when the mechanical key is inserted into a hole of the key release in the shifter 4, this presses the key release SW. Accordingly, the power source for the part relating the shift operation of the vehicle is started up. In this state, when the shifter 4 is operated, the transmission is allowed to shift to a given transmission range (actually N range).

Further, in the vehicle (not limited to the hybrid vehicle) including an electric parking brake (EPB 5), there is provided the actuator 1a for supplying a power to the EPB 5 and the automatic transmission 1. The actuator 1a includes a function of generating an electric power supplied to the automatic transmission 1. Further, the EPB 5 restricts a movement of the vehicle by locking a rotation of a gear in the automatic transmission 1 (restricts rotation of the driving wheel) to set the automatic transmission 1 in the state of the parking lock when, for example, the EPB 5 receives a predetermined signal (P lock signal) received from the TCU 1b.

The EPB 5 is configured as follows:

When receiving the P lock signal, which causes the automatic transmission 1 to be locked, from the TCU 1b, the EPB 5 makes a parking lock state by controlling the automatic transmission 1 and on the other hand, when receiving a signal for releasing the parking lock from the TCU 1b, the EPB 5 releases the parking lock by controlling the automatic transmission 1. Further, the vehicle is provided with a sensor (P sensor 1c) for detecting that the automatic transmission 1 is brought to the parking lock state. For example, the P sensor 1c is configured to generate and transmit a detection signal (lock detection signal) to the TCU 1b when the automatic transmission 1 is brought to the parking lock state. The TCU 1b is configured detecting that the automatic transmission 1 is parking-locked from the lock detection signal transmitted from the P sensor 1c.

The actuator 1a, the P sensor 1c, and the EPB 5 are supplied with an electric power from the TCU 1b. Further, the TCU 1b has a function of stopping supplying an electric power to the actuator 1a, the P sensor 1c, the EPB 5, and the TCU 1b can sleep the automatic transmission 1 using this function. Here, the state in which the electric power to the actuator 1a, the P sensor 1c, and the EPB 5 is stopped is called a sleep state of the automatic transmission 1.

The vehicle configured as described above including an SBW (Shift-by-wire) shifter function is provided with a controller such as the ECU 2. The ECU 2 includes functions of detecting a rotational speed of the engine or a motor and a vehicle speed and preferably includes a function of informing the TCU 1b of the detected rotational speed and the vehicle speed by data communication, etc. using CAN (Controller Area Network), etc.

Further, the ECU 2 is configured being capable of acquiring a state (ON/OFF) of the ignition from an IG signal which indicates ON/OFF of the ignition and is transmitted from the ignition switch. Further, the ECU 2 is preferably configured to start up the automatic transmission when the ignition is turned to the ON state. More specifically, it is preferable to provide a configuration as follows:

When the ignition is turned to the ON state, the ECU 2 applies an instruction to the TCU 1b. Further, the TCU 1b supplies an electric power to the actuator 1a, the P sensor 1c, and the EPB 5 on the basis of the applied instruction.

On the other hand, it is preferable to provide a configuration to bring the automatic transmission to a sleep state when the ignition is turned to the OFF state. More specifically, the ECU 2 is configured to apply an instruction to the TCU 1b when the ignition is turned to the OFF state. The TCU 1b stops supplying the electric power to the actuator 1a, the P sensor 1c, and the EPB 5 on the basis of the applied instruction.

In addition, the ECU 2 preferably includes a function of controlling to supply the electric power to the motor and other accessories (not shown) in addition to the automatic transmission 1 in accordance with the state of the ignition.

Further, the TCU 1b is configured as follows:

When the automatic transmission 1 is activated, the TCU 1b acquires a shift position selected by the driver with the shifter 4 from a shift position signal transmitted from the shift sensor to control the automatic transmission 1 in accordance with the shift position selected by the driver. For example, the TCU 1b determines a transmission gear ratio (in a transmission with multistage transmission, a stage) is determined to be set in the automatic transmission 1 in accordance with the speed or the rotation speed of the engine of the vehicle and the shift position selected by the driver with a shift button (or a shift lever) provided to the shifter 4. The TCU 1b transmits to the actuator 1a a control signal (a gear shift signal) for changing the automatic transmission 1 to have the determined stage. The actuator 1a supplies a driving current to the automatic transmission 1 on the basis of the received gear shift signal. The actuator 1a supplies the driving current to the automatic transmission 1 on the basis of the received gear shift signal to switch to the transmission gear ratio determined by the TCU 1b by driving the automatic transmission 1.

Further, a term of "control unit" corresponds to the TCU 1b. The term of "control device" corresponds to a configuration including the shifter (shift selecting unit) 4 and the TCU 1b.

Figure 4:
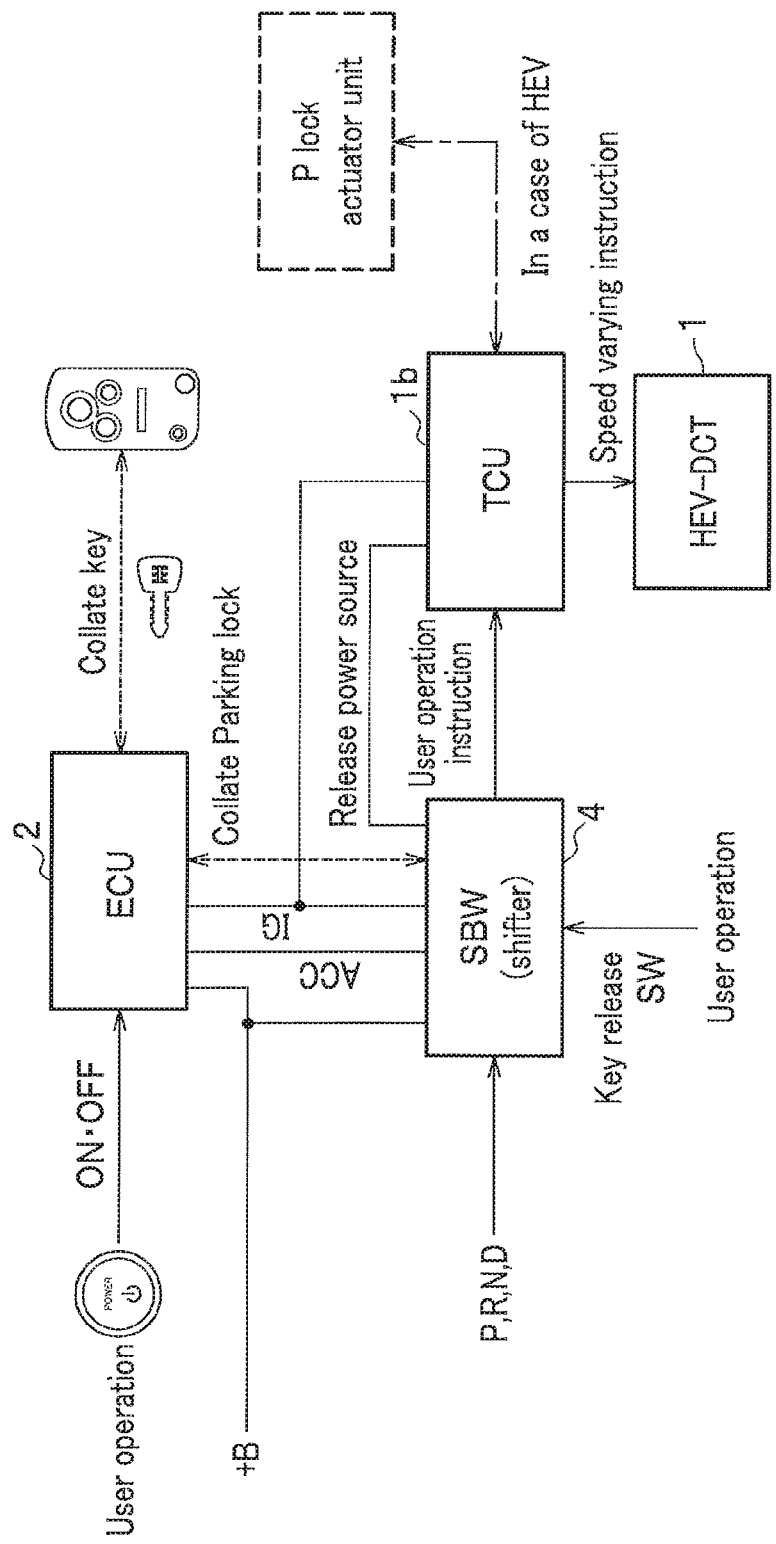
FIG. 4 is a drawing illustrating a region among the electric power source control unit, a shifter, and a transmission.

FIG. 4 is a drawing illustrating a relation among the HEV-DCT 1, the TCU 1b, the ECU 2, and the shifter 4 extracted from FIG. 3. Generally seeing, it can be understood that when a user's operation is inputted to the ECU 2 and the SBW (Shift by wire: shifter) 4, the input signal is applied to the automatic transmission (HEV-DCT) 1 through the TCU 1b.

As described above, an example of turning on/off the ignition by operating the switch. A mode of turning on/off the ignition is not limited to this example.

Images (figures) displayed on a monitor (such as a multi-information display (MID) or a navigation system) while the vehicle washer mode, are not limited to the images as illustrated on drawings. In the present invention, it is assumed that a voice, an ideogram, and both are used.

In the vehicle washer mode, when the driver makes an operation to turn off the ignition (turning off the engine) until several seconds (first predetermined period) has passed after the shifter is shifted to the neutral position, the neutral position is selected while the engine is turned off (while the ignition (is turned off).

In the case that the shifter is at any one of the shift positions of P, R, N, or D (D including Deceleration B or L) while the ignition is in the ON state, when the ignition is turned off though there is no intention to enter the vehicle washer mode, P is automatically selected and after this, the ignition is turned off.

Figure 5:
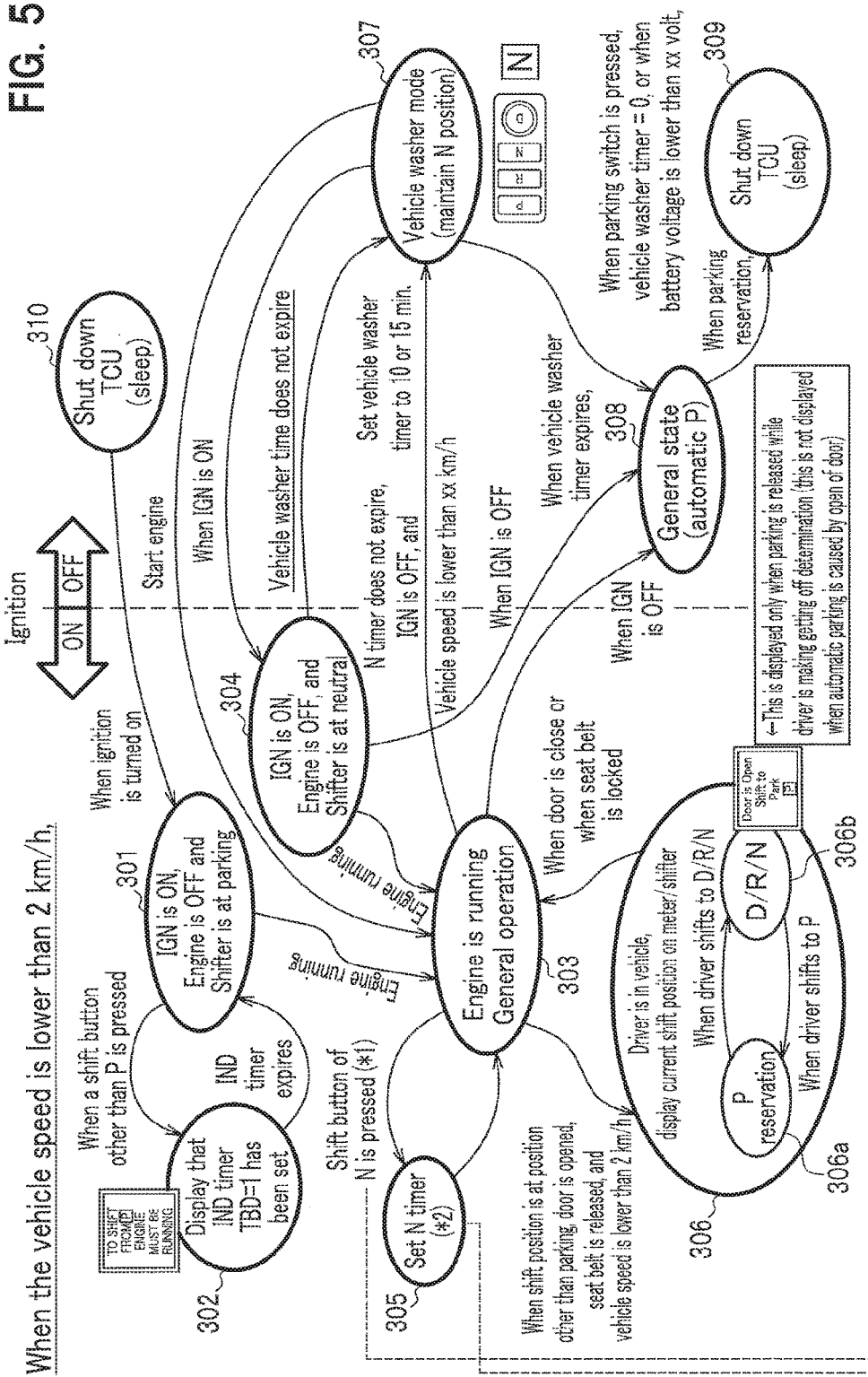
FIG. 5 is a drawing illustrating state transitions in a general operation mode and a vehicle washer mode.

FIG. 5 is a state transition drawing illustrating the shift-by-wire vehicle washer mode in which the shift position is automatically changed to the P in response to turning off the ignition and the shift position is automatically changed to the P in response to opening a door. Further, there is a description about door opening in FIG. 5. This corresponds to a specification defining that the transmission is automatically set in the parking range when the door is opened.

Generally seeing FIG. 5, a left side of a vertical broken line shows the ON state of the ignition, and the right side shows the OFF state of the ignition. In a state 301 in which the ignition is ON, the engine is OFF, and the shifter is at the parking position, when the shift button other than the parking is pressed, the MID displays a message of "the engine must run to make a shifting from the parking position to other position and starts up an IND timer to start counting of the displayed time in a state 302. When the IND timer expires (a predetermined time period has passed), the state returns to state 301 (display is turned off).

When the engine rotation is started in the state 301, the state makes transient to a state 303. In a state 304 in which the ignition is ON, the engine is OFF, and the shifter is at the neutral position, when the engine rotation is started, this state also shifts to the state 303. In the state 303, the engine is rotating and a general operation is made.

When the shift button of the neutral position is pressed in the state 303, an N (neutral) timer is started up in a state 305, and after this, the state returns to the state 303. During this, even though the shift button of the neutral position is pressed to aim to shift from the driving position to the reveres position, the state does not shift to the state 305. This is because though the N timer is set, when the shift button of the neutral position is pressed, and after this, a shift button of other shift position is pressed, the N timer is reset to "0".

In the state 303, when the shift position is at a position other than parking, a door is opened, a seat belt is released, and a speed of the vehicle (vehicle speed) is lower than 2 km/h, the state shifts to a state 306. In the state 306, the driver is in the vehicle carbine. A current shift position is displayed on a meter or the shifter. In this state, when the driver shifts the shift position to the driving, the reverse, or the neutral position, the state shifts to a D/R/N display state 306b. In a state 306b, only when the shift is removed from the parking position while the driver is determining to get off the vehicle, the MID indicates a message of "The door is open. Make a shift to the parking position". On the other hand, when the driver makes a shift to the parking position, a transition is made to a parking reserving display state 306a.

In the state 306, when the door is closed or the seat belt is locked, the state returns to a state 303. In the state 304, when the ignition is turned off and a vehicle washer timer (counting $T_2$ as described above) does not expire, the state shifts to a state 307. The state 307 is the vehicle washer mode, and the neutral position is maintained. In the state 303, when the ignition is turned off and the N timer (counting the $T_1$ as described above) does not expire, and the vehicle speed is lower than a predetermined value, the state shifts to the state 307. In this state, the vehicle washer timer is set to 10 minutes or 15 minutes.

In the state 304, when the ignition is turned off and the vehicle washer time expires, the state shifts to a state 308. In the state 303, when the ignition is turned off, also the state shifts to the state 308. The state 308 is a general automatic parking mode (not related to the vehicle washing). In the state 307, when the parking switch is pressed, when remaining time of the vehicle washer timer becomes "0" (ten minutes or fifteen minutes has passed), or when the battery voltage becomes lower than a predetermined value, the state shifts to the state 308.

In the state 308, when the parking reservation is made, the state shifts to a state 309. In the state 309, the TCU 1b is in a state of shut down or in a sleep state. In the state 307, when the ignition is turned on, the state shift to the state 304. In the state 307, when the engine is started, the state shifts to the state 303. In a state 310 (which is the same as the state 309), when the ignition is turned on, the state shift to the state 301.

FIG. 6 is an illustration illustrating an interaction between the system and the driver in the vehicle washer mode according to an embodiment of the present invention.

A first row in FIG. 6 indicates operations by the driver, the second and lower rows indicate responses/functions by the system corresponding to the driver's operation. More specifically, the second row indicates an indication contents of the MID (multi information display), the third row indicates voices, the fourth row indicates positions of the shifter, the fifth row indicates a position of the ignition, the sixth row indicates the state of the engine, the seventh row indicates timer values of the TCT timer, the eighth row indicates the battery voltage, and the ninth row indicates whether the shifter is the same as conventional prior art general shifter or not.

The present embodiment features ("NO" in a line 321g) that the operation of the driver makes a shift from P position to R/N/D as shown in a line 321. Accordingly, hereinafter only the line 321 is described. The line 321 in FIG. 6 corresponds to a state 302 in FIG. 5. In the line 321, the ignition is in the ON state (a row 321d), the engine stops (a row 321e), the battery voltage is 12 volts (a row 321f), and the parking position is selected in a state 321b. In this state, when the driver presses the shift button (N) other than parking (321c), a multi-information display (MID) displays "the engine must be running to make a shift from the parking position to other position".

FIG. 7g is a drawing according to an embodiment of the present invention illustrating interaction between the system and the driver in the vehicle washer mode using a CAN (Controller Area Network) signal for meter displays. The first row in FIG. 7 indicates an operation by the driver. The second and lower rows indicate a response/function of the system corresponding to the driver's operation. More specifically, the second row indicates a display content of the MID. The third row indicates positions of the shifter, the fourth row indicates the TCU modes, and the fifth row indicates a TCU output-CAN signal for display.

In FIG. 7, the present embodiment features a line 322 corresponding to the line 321 in FIG. 6. When the driver presses the shift button (N) other than the parking (322a), the TCU 1b transmits the CAN signal indicating "SBW_MID_SHIFT_FROM_P=1" 322b to the MID. The MID displays, based on the signal, a message of "the engine must be running to make a shift from the parking position to another position".

DESCRIPTION OF REFERENCE SYMBOLS

1 HEV-DCT
1a Actuator
1b TCU
1c Parking sensor
2 ECU
3 12V-battery
4 Shifter
5 EPB

The invention claimed is:

1. A control device for a vehicle switching a shift range of an automatic transmission with an actuator, comprising:
shift selecting unit receiving a selection of one of shift positions by a driver;
control unit switching the shift range to a parking range with the actuator when a vehicle electric power source is turned off or when a drive power source stops, wherein
in a state in which the vehicle electric power source is in an ON state, or in a state in which the drive power source is running, the control unit maintains a neutral range when the vehicle electric power is turned off or when the drive power source stops until a first predetermined period has passed after the shift selecting unit receives the selection of the neutral position, wherein
the control unit switches the shift range to the parking range with the actuator when the vehicle electric power is turned off or when the driving power source stops, after the first predetermined period has passed after the shift selecting unit receives the selection of the neutral position, and
wherein when the neutral range is maintained in a state in which the vehicle electric power source is in an OFF state, or in a state in which the drive power source is stopping, only for a second predetermined period, the control unit brings a part of the vehicle power source to a started up state and alarms that the vehicle is in a state in which the neutral range is maintained.

2. The control device as claimed in claim 1, wherein the control unit comprising:
at least one of a power switch controlling power on/off of the vehicle electric power source and a starter switch controlling start and stop of the drive power source, and wherein
the control unit maintains the neutral range when the power switch is turned off or when the starter switch is turned off or to an accessory selecting state until the first predetermined period has passed after reception of the selection of the neutral position.

3. The control device as claimed in claim 1, wherein when the control unit is maintaining the neutral range in a state in which the vehicle electric power source is in an OFF state, or in a state in which the drive power source is stopping, the control unit brings a power source necessary for operating the shift selecting unit to a started up state, and switches the shift range to the parking range when the shift selecting unit receives the selection of the parking position.

4. The control device as claimed in claim 1, wherein
the control device of the vehicle comprises a vehicle speed detecting unit detecting a speed of the vehicle, and wherein
when the control unit is maintaining the neutral range in a state in which the vehicle electric power source is in an OFF state, or when the neutral range is maintained in a state in which the drive power source is stopping, the control unit switches the shift range to the parking range when the vehicle speed equal to or higher than a predetermined value.

5. The control device as claimed in claim 1, wherein
the control unit switches the shift range to the parking range when a second predetermined period has passed after the control unit maintains the neutral range when the neutral range is maintained in a state in which the vehicle electric power source is in an OFF state, or in a state in which the drive power source is stopping.

6. The control device as claimed in claim 1, further comprising a starter switch controlling the vehicle electric power source to turn on/off and the drive power source to start up and stop, wherein
the control unit maintains the neutral range when the starter switch is turned off or to an accessory selection state at time until the first predetermined period has passed after the shift electing unit receives a selection of the neutral position and alarms the operator that the vehicle electric power source is started up when a second predetermined period has passed while the neutral range is maintained or when the shift selection unit receives the selection of the parking position.

7. A control method for a vehicle, comprising:
receiving a selection of one shift position of a plurality of shift positions by a driver with a shift selecting unit; and
switching, by a control unit, the shift range to a parking range through the use of an actuator when a vehicle electric power source is turned off or when a drive power source stops, wherein in a state in which the vehicle electric power source is in an ON state, or in a state in which the drive power source is running, the control unit maintains a neutral range when the vehicle electric power is turned off or when the drive power source stops until a first predetermined period has passed after the shift selecting unit receives the selection of the neutral position, wherein the control unit switches the shift range to the parking range with the actuator when the vehicle electric power is turned off or when the driving power source stops, after the first predetermined period has passed after the shift selecting unit receives the selection of the neutral position, and wherein when the neutral range is maintained in a state in which the vehicle electric power source is in an OFF state, or in a state in which the drive power source is stopping, only for a second predetermined period, the control unit brings a part of the vehicle power source to a started up state and alarms that the vehicle is in a state in which the neutral range is maintained.

8. The method as claimed in claim 7, wherein the control unit comprising:

at least one of a power switch controlling power on/off of the vehicle electric power source and a starter switch controlling start and stop of the drive power source, and wherein the control unit maintains the neutral range when the power switch is turned off or when the starter switch is turned off or to an accessory selecting state until the first predetermined period has passed after reception of the selection of the neutral position.

9. The method as claimed in claim 7, wherein when the control unit is maintaining the neutral range in a state in which the vehicle electric power source is in an OFF state, or in a state in which the drive power source is stopping, the control unit brings a power source necessary for operating the shift selecting unit to a started up state, and switches the shift range to the parking range when the shift selecting unit receives the selection of the parking position.

10. The method as claimed in claim 7, wherein the control device of the vehicle comprises a vehicle speed detecting unit detecting a speed of the vehicle, and wherein when the control unit is maintaining the neutral range in a state in which the vehicle electric power source is in an OFF state, or when the neutral range is maintained in a state in which the drive power source is stopping, the control unit switches the shift range to the parking range when the vehicle speed equal to or higher than a predetermined value.

11. The method as claimed in claim 7, wherein the control unit switches the shift range to the parking range when a second predetermined period has passed after the control unit maintains the neutral range in a state in which the vehicle electric power source is in an OFF state, or in a state in which the drive power source is stopping.

12. The method as claimed in claim 7, further comprising a starter switch controlling the vehicle electric power source to turn on/off and the drive power source to start up and stop, wherein the control unit maintains the neutral range when the starter switch is turned off or to an accessory selection state until the first predetermined period has passed after the shift selecting unit receives a selection of the neutral position and alarms the operator that the vehicle electric power source is started up when a second predetermined period has passed while the neutral range is maintained or when the shift selection unit receives the selection of the parking position.

* * * * *